(No Model.)
C. DRISCOLL.
RETAINER FOR NUTS AND OTHER PORTIONS OF MACHINERY.
No. 350,725. Patented Oct. 12, 1886.
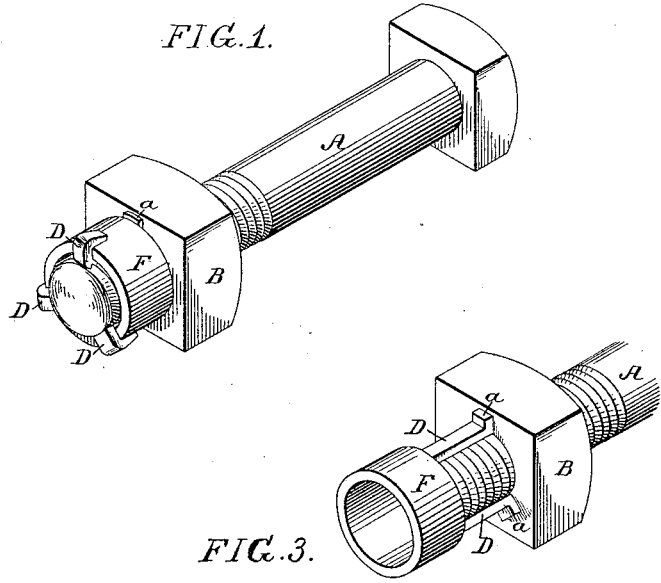
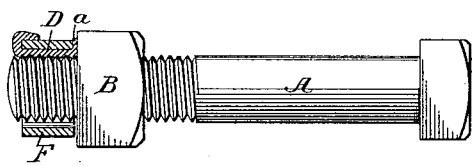
Witnesses:
William D. Conner
John E. Parker
Inventor:
Con Driscoll
by his Attorneys
Howson and Sons

UNITED STATES PATENT OFFICE.

CON DRISCOLL, OF ANACONDA, MONTANA TERRITORY.

RETAINER FOR NUTS AND OTHER PORTIONS OF MACHINERY.

SPECIFICATION forming part of Letters Patent No. 350,725, dated October 12, 1886.

Application filed July 2, 1886. Serial No. 206,943. (No model.)

*To all whom it may concern:*

Be it known that I, CON DRISCOLL, a citizen of the United States, residing in Anaconda, Montana Territory, have invented certain Improvements in Retainers for Nuts and other Portions of Machinery, of which the following is a specification.

The object of my invention is to construct a simple and efficient form of retainer for nuts and other portions of machinery; and this object I attain in the manner which I will now proceed to describe, reference being had to the accompanying drawings, in which—

Figure 1 is a perspective view of a bolt and nut, with a nut-lock constructed in accordance with my invention; Fig. 2, a side view, the nut-lock being shown in section; and Fig. 3 a view showing the mode of making the nut-lock in accordance with my invention.

A represents a bolt, and B a nut applied to the threaded stem of the bolt in the usual manner. In order to lock this nut I apply to that portion of the stem of the bolt which projects beyond the said nut a number of strips, D, of copper or other soft metal or alloy, three of such strips being shown in the drawings, although more or less than this number may be used, if desired. After the strips have been applied, I drive over the same a ring, F, whereby the soft metal of the strips is driven into the thread of the bolt, and the strips thereby prevented from turning on the latter, the outer projecting ends of the strips being preferably turned up and bent back over the ring F, as shown in Figs. 1 and 2.

The inner ends of the strips are preferably provided with upturned ends or heads $a$, to bear against the outer face of the bolt, and the ring, with its strips, may be used in place of the nut, or as a substitute for the nut and washer on many different kinds of machinery. Instead of driving the ring longitudinally over the soft-metal locking-strips, said ring may be split and compressed over the strips by means of a suitable tool, but the ring is preferably constructed and applied in the manner shown.

The device forming the subject of my invention may be used as a nut or retainer on a plain rod, instead of on a bolt, if desired, the rod in such case being provided with transverse notches or recesses for engagement with the soft-metal locking-strips.

I claim as my invention—

1. The combination of a bolt with a soft-metal strip laid longitudinally on the bolt and confined by an outer ring, whereby said strip is caused to engage with the teeth or other projections of the bolt, all substantially as specified.

2. The combination of the bolt, the confining-ring, and a soft-metal strip interposed between said ring and the bolt and having an upturned end or head, forming an end bearing, all substantially as specified.

In testimony whereof I have signed my name to this specification in the presence of two subscribing witnesses.

CON DRISCOLL.

Witnesses:
E. B. WATERBURY,
JAMES M. PARRISH.